United States Patent
Hitosugi et al.

(10) Patent No.: US 6,682,078 B2
(45) Date of Patent: Jan. 27, 2004

(54) RING GROOVE FOR OIL RING WITH COIL EXPANDER OF PISTON

(75) Inventors: Hideshi Hitosugi, Yono (JP); Nobuyuki Murakami, Toyota (JP); Taro Itoh, Toyota (JP)

(73) Assignees: Nippon Piston Ring Co., Ltd., Saitami-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/193,178

(22) Filed: Jul. 12, 2002

(65) Prior Publication Data

US 2002/0174768 A1 Nov. 28, 2002

Related U.S. Application Data (63) Continuation of application No. 09/536,041, filed on Mar. 27, 2000.

(30) Foreign Application Priority Data

Mar. 31, 1999 (JP) ............................................... 11-90900

(51) Int. Cl.$^7$ .......................... B60T 11/236; F02F 5/00; F16J 9/12
(52) U.S. Cl. ....................... 277/449; 277/451; 277/452; 277/453; 277/455; 277/457
(58) Field of Search .................................. 277/434, 435, 277/447, 449, 450, 451, 452, 453, 454, 455, 457, 467, 472

(56) References Cited

U.S. PATENT DOCUMENTS

| | | | |
|---|---|---|---|
| 1,930,654 A | 10/1933 | Muchnic | |
| 2,060,335 A | * 11/1936 | Muchnic | .................. 277/469 |
| 2,170,970 A | 8/1939 | Johnston | |
| 2,182,851 A | * 12/1939 | Muchnic | .................. 277/489 |
| 2,269,944 A | 1/1942 | Kurth | |
| 2,459,157 A | 1/1949 | Frisby | |
| 2,951,732 A | 9/1960 | Brenneke | |
| 3,104,594 A | 9/1963 | Reiners | |
| 3,291,497 A | 12/1966 | Cross | |
| 3,347,555 A | 10/1967 | Norton | |
| 3,554,568 A | 1/1971 | Heid, Jr. | |
| 3,608,911 A | 9/1971 | Prasse | |
| 4,210,338 A | 7/1980 | Collings, Jr. | |
| 5,618,046 A | 4/1997 | Binford | |
| 5,651,553 A | 7/1997 | Ishida et al. | |
| 6,213,474 B1 | * 4/2001 | Sameshima et al. | .................. 277/434 |

FOREIGN PATENT DOCUMENTS

| | | |
|---|---|---|
| DE | 1 789 799 | 6/1959 |
| DE | 1 299 945 | 7/1969 |
| FR | 2 594 489 | 8/1987 |
| GB | 1 462 358 | 1/1977 |
| JP | U4738204 | 12/1972 |

* cited by examiner

Primary Examiner—Anthony Knight
Assistant Examiner—Vishal Patel
(74) Attorney, Agent, or Firm—Birch, Stewart, Kolasch & Birch, LLP

(57) ABSTRACT

A ring groove for a two-piece oil ring of a piston is provided that has ring body equipped with a coil expander, wherein the ring body has an upper outer surface and a lower outer surface, both orthogonal to the axial direction of the piston. The ring groove also has an upper inner surface and a lower inner surface, both orthogonal to the axial direction of the piston; a radially inward-most, bottom surface connecting the upper and lower inner surfaces; and oil drain holes, each having an opening thereof located on the bottom surface. The ring groove has an axial width slightly greater than the width of the two-piece oil ring. The ring groove has a radially inward ends of the upper and lower surfaces of the ring groove, respectively, located radially inwardly apart by a first predetermined distance from the radially inward ends of the upper and lower outer surfaces of the ring body when the oil ring is mounted within the ring groove so that the outer circumferential surface of the ring body is in contact with the inner circumferential surface of a cylinder which is engaged with the piston.

12 Claims, 7 Drawing Sheets

RING GROOVE FOR OIL RING WITH COIL EXPANDER OF PISTON

This application is a continuation of co-pending application Ser. No. 09/536,041, filed on Mar. 27, 2000, the entire contents of which are hereby incorporated by reference and for which priority is claimed under 35 U.S.C. §120; and this application claims priority of application Ser. No. 11-90900 filed in Japan on Mar. 31, 1999 under 35 U.S.C. §119.

FIELD OF THE INVENTION

The present invention relates to a ring groove for an oil ring with a coil expander of a piston.

BACKGROUND OF THE INVENTION

Figure 1:
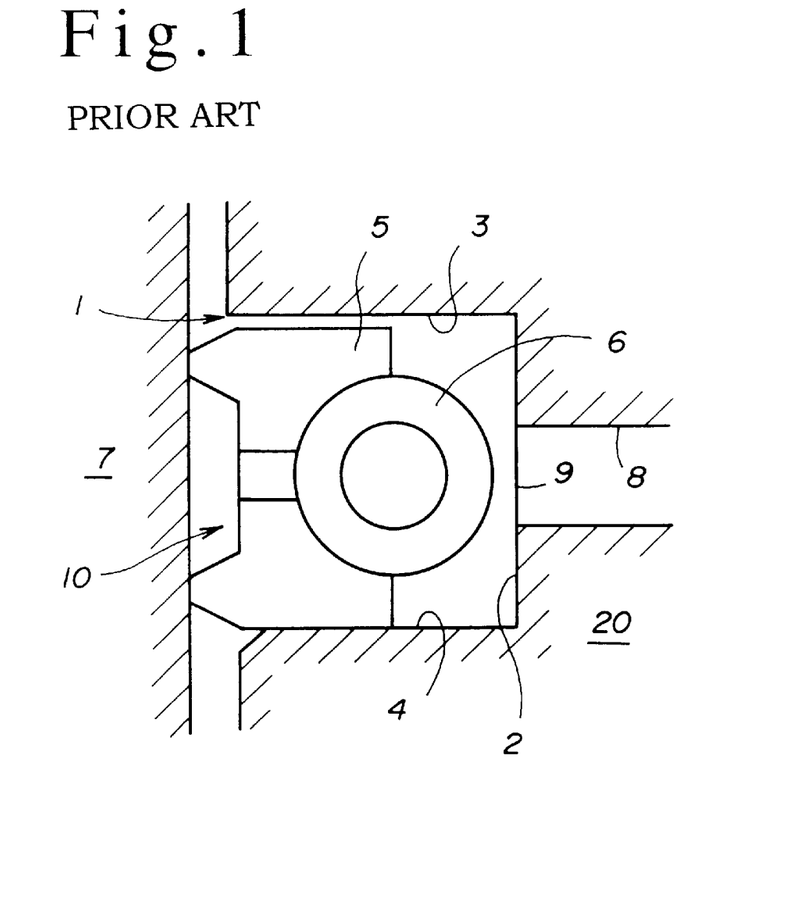
FIG. 1 is an enlarged cross-sectional view of an illustrative ring groove of prior art.

FIG. 1 shows an enlarged cross-sectional view of an illustrative ring groove of prior art. As shown in FIG. 1, conventional ring grooves 1 of a piston 20 for oil rings 10 each having a coil expander 6, have been of a rectangular cross-section either with square inner corners, or rounded inner corners as proposed in Japanese Utility Model Laid-Open Publication (JP-U) 47-38204 (1972). Such a ring groove 1 of a rectangular cross-section, includes a radially inward-most, bottom surface 2, an upper inner surface 3 and a lower inner surface 4, both orthogonal to the axial direction of the piston 20. The ring groove 1 has a two-piece oil ring 10 mounted or inserted therein, where the oil ring 10 includes a ring body 6 and a coil expander 6 assembled together, with the axial width of the ring groove 1 set to be slightly greater than the width of the ring body 5, specifically, for example, by 0.04–0.06 mm.

When used in this text, "axial" and "radial" respectively mean association with the axial and radial directions of a piston wherein the ring groove is formed, and "inward" means a sense toward the center of the piston in the radial direction of the piston.

The bottom surface 2 of the ring groove 1 must not be in contact with the radially inward end of the coil expander 6 even when the piston 20 does an oscillating motion when actually working involving thermal expansion. Because of this, the bottom surface 2 was set to be located radially inwardly apart from the radially inward end of the coil expander 6 by a predetermined distance, e.g., around 1/200, of the inner diameter of a cylinder 7 engaged with the piston when the outer circumferential surface of the ring body 6 is in contact with the inner circumferential surface of the cylinder 7.

An opening 9 of each of oil drain holes 8 to drain the oil within the ring groove 1 to the oil pan, was provided in a position lower than the center of the axial width of the ring groove 1 on the bottom surface 2, or on the lower inner surface 4 of the ring groove 1.

The coil expander 6 of a two-piece oil ring projects inward from the inward or rear end of the ring body 5 by a distance equivalent to nearly a half of the outer diameter of the coil expander 6. Therefore, the cavity space behind the rear end of the ring body 5 of the oil ring 10 in the ring groove is relatively large. This cavity space has become far greater especially when the ring body has been made thinner to improve the conformability of the oil ring to the cylinder.

Figure 2:
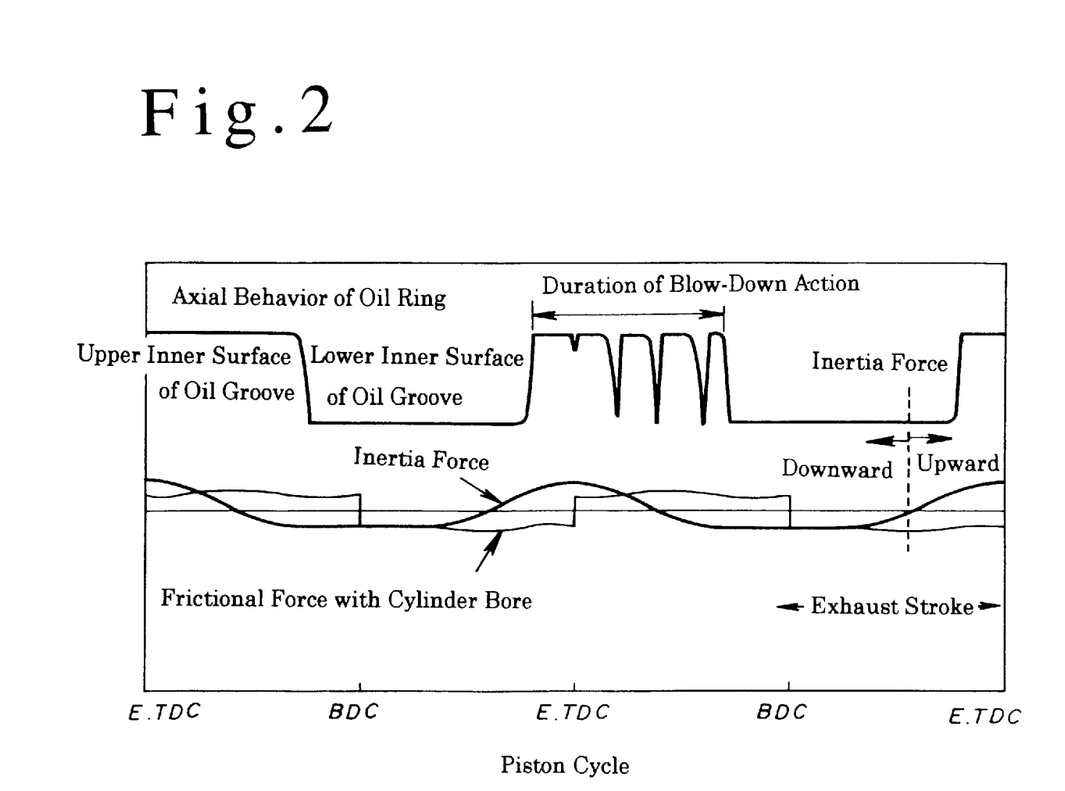
FIG. 2 is an illustrative graph showing the axial behavior, frictional force and inertia force observed with an actually working oil ring.

FIG. 2 is an illustrative graph showing the axial behavior, frictional force and inertia force observed with an actually working oil ring, and FIG. 3 is a schematic drawing showing the behavior of oil within a ring groove, showing a prior art example in (a), (b) and (c), and an embodiment case in (d), (e) and (f). As shown in FIG. 2, when actually working, an oil ring in a ring groove is affected by frictional force with the cylinder, inertia force caused by the piston motion, and gas pressure caused by combustion. In the exhaust stroke, even when the inertia force acts upward, the oil ring 10 stays on the lower side of the ring groove 1 during a certain period due to the frictional force, whereby a gap is caused above the upper surface of the oil ring 10, as shown in FIG. 3(*a*). At that time, the oil in the cavity space behind the rear end of the ring body in the ring groove, gets in the gap above the upper surface of the oil ring 10. Subsequently, when the inertia force overcomes the frictional force, and the oil ring 10 thereby moves toward the upper side of the ring groove 1, the oil that got in the gap above the upper surface of the oil ring 10 is pushed out toward the outer circumferential surface of the piston, as shown in FIG. 3(*b*). Subsequently, as shown in FIG. 3(*c*), the oil rises from the ring groove 1 by means of the inertia force, and moves toward the combustion chamber to be burned and disappear there. Thus, if the cavity space behind the oil ring in the ring groove is large, then. the volume of oil existing in the cavity space and the volume of oil rising from the oil ring are also become large, whereby the oil consumption also consequently increases.

Blow-by gas has an affect of blowing the oil in the cavity space behind the oil ring down toward the oil drain holes. However, because the cavity space is large, and the opening of the oil drain holes is positioned lower than the coil expander, the blowing-down effect of blow-by gas is restrained, thereby leaving some oil on the upper side of the cavity space.

The present invention is made to prevent the increased oil consumption due to the cavity space behind the oil ring in the ring groove. An object of the present invention is therefore to provide a ring groove for two-piece oil ring, capable of reducing the oil consumption.

SUMMARY OF THE INVENTION

To accomplish the object above, according to the present invention, a ring groove (11), of a piston (20), for a two-piece oil ring (10) is provided that has a ring body (5) equipped with a coil expander (6), where the ring body has an upper and a lower outer surfaces, both orthogonal to the axial direction of the piston. The ring groove has an upper inner surface (13) and a lower inner surface (14), both orthogonal to the axial direction of the piston; a radially inward-most, bottom surface (12) connecting the upper and lower inner surfaces; and oil drain holes (18) each having an opening (19) thereof located on the bottom surface. The ring groove has an axial width slightly greater than the width of the two-piece oil ring.

According to an embodiment of the present invention, the ring groove has the radially inward ends (15, 16) of the upper and lower inner surfaces of the ring groove respectively located radially inwardly apart by a first predetermined distance from the radially inward ends of the upper and lower outer surfaces of the ring body when the oil ring is mounted within the ring groove so that the outer circumferential surface of the ring body is in contact with the inner circumferential surface of a cylinder (7) engaged with the piston, where, according to an aspect of the present invention, the first predetermined distance is preferably not smaller than 1/300, and not greater than 1/100 of the inner diameter of the cylinder (7).

The bottom surface (12) of the ring groove, according to the embodiment, comprises: a concave surface line formed by a generating line (17, 21) drawn on a cross-sectional plane of the ring groove along the centerline of the piston, the generating line having the upper and lower ends thereof located coinciding with the radially inward ends (16, 16) of the upper and lower inner surfaces of the ring groove, the generating line surrounding the coil expander (6) projecting from the radially inward end of the ring body so that the generating line is apart from the surface of the projecting portion of the coil expander by a certain predetermined distance. According to an aspect of the present invention, the certain predetermined distance is preferably around a range of 1/300 to 1/100 of the inner diameter of the cylinder (7).

Although the ring groove, according to the present invention, has the same axial width and radial depth as with the conventional ring grooves, the ring groove, according to the present invention, has a by far smaller cavity space behind the oil ring, or ring body, than with the conventional ring grooves. Thus, the oil volume remaining in the cavity space to flow out to the gap above the upper surface of the ring body, is remarkably reduced in comparison with the conventional ring grooves.

According to another embodiment of the present invention, the opening of the oil drain hole is located approximately in the center of the axial width of the ring groove in the bottom surface of the ring groove, which enables the oil remaining in the cavity space to be returned to the oil pan by utilizing the blowing-down effect of the blow-by gas.

In case of certain difficulty in utilizing the blowing-down effect, however, it may be arranged, similar to the conventional ring grooves, that the opening of the oil drain hole is located as low as the lower inner surface of the ring groove, or even lower, to enable the oil scraped down by the oil ring to be quickly returned to the oil pan.

Thus, with the arrangement described above, according to the present invention, a ring groove is obtained that has an advantage in that the oil volume remaining in the cavity space to flow out to the gap above the upper surface of the ring body is remarkably reduced in comparison with the conventional ring grooves, thereby enabling to reduce the oil consumption outstandingly.

Other objects and advantages of the present invention may become more apparent by referring to the following detailed description and accompanying drawings briefly described below.

DETAILED DESCRIPTION

Figure 4:
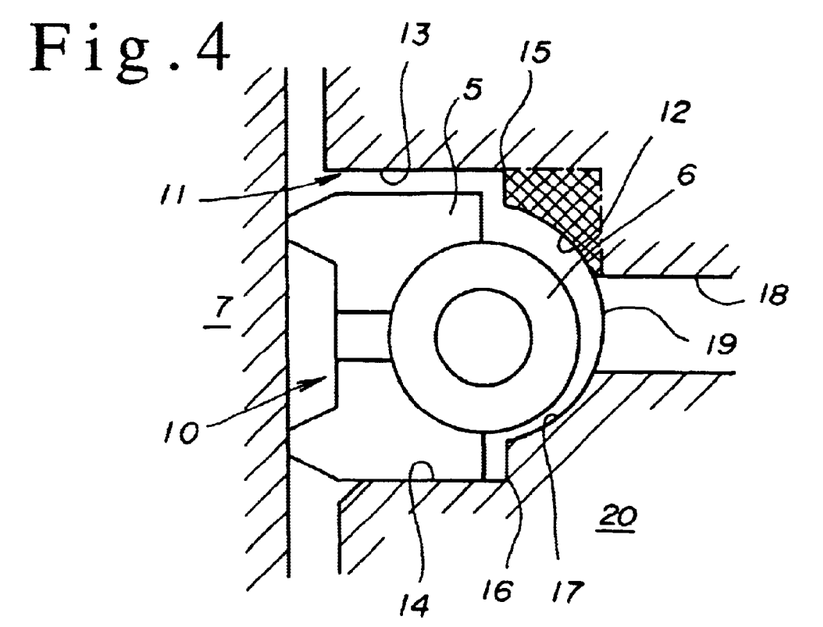
FIG. 4 is an enlarged cross-sectional view of an illustrative ring groove, according to a first embodiment of the present invention.

Hereunder, the present invention is discussed referring to an illustrative ring groove based on a first embodiment of the present invention, shown in FIG. 4.

FIG. 4 is an enlarged cross-sectional view of an illustrative ring groove, according to a first embodiment of the present invention. As shown in FIG. 4, a ring groove 11 of a piston has a two-piece oil ring 10 mounted or inserted therein so that the outer circumferential surface of a ring body 6 of the oil ring 10 is in contact with the inner circumferential surface of a cylinder engaged with the piston. The axial width of the ring groove 11 corresponding to the axial distance between an upper inner surface 13 and a lower inner surface 14, both orthogonal to the axial direction of the piston, is set to be the same as the conventional ring grooves, i.e., slightly greater than the axial width of the ring body 5 of the mounted two-piece oil ring 10, specifically, by 0.04–0.06 mm.

Figure 5:
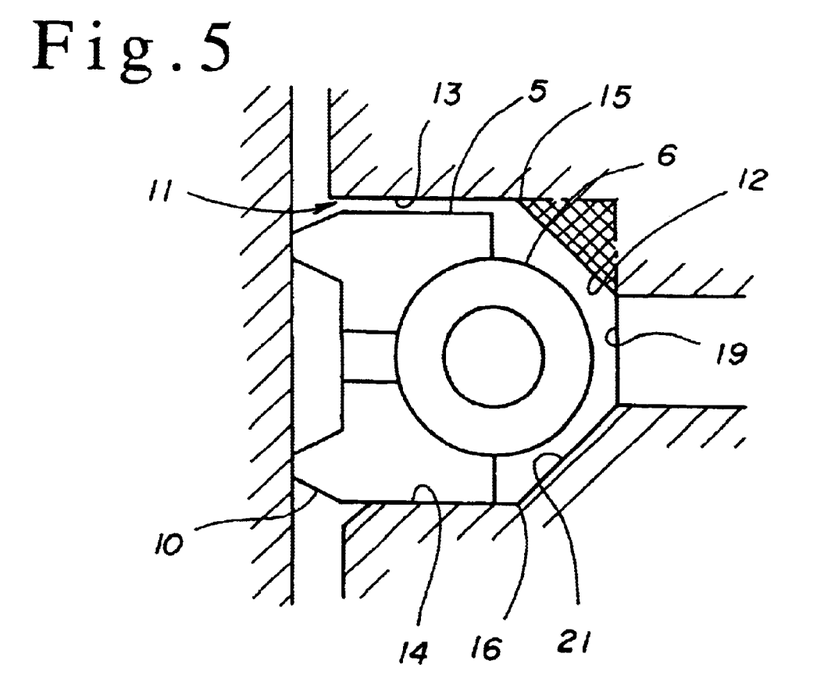
FIG. 5a is a cross-sectional view depicting a round-bottomed concave surface as the bottom surface formed by a generating line drawn by combining the circular arc of the first embodiment and the slant lines tangent to the circular arc of the second embodiment with a drain hole lower than the inner surface of the ring groove.

In the cross-section shown in FIG. 5, the radially inward ends 15, 16 of the upper and lower inner surfaces 13, 14 of the ring groove 11 are respectively located radially inwardly apart by a first predetermined distance from the radially inward ends of the upper and lower outer surfaces of the ring body. The first predetermined distance may be preferably set not smaller than 1/300, and not greater than 1/100, e.g., around 1/200, of the inner diameter of the cylinder 7.

The ring groove 11 has a radially inward-most, bottom surface 12 connecting the upper and lower inner surfaces 13, 14. The bottom surface 12 is a round-bottomed concave surface formed by a generating line 17 drawn on a cross-sectional plane of the ring groove along the centerline of the piston. According to this first embodiment, the generating line 17 comprises a circular arc and two axial straight lines. The circular arc has the center thereof located axially coinciding with the center of the axial width of the ring groove 11 and radially coinciding with the center of the coil expander 6 when the oil ring 10 is mounted within the ring groove 11 so that the outer circumferential surface of the ring body 5 is in contact with the inner circumferential surface of the cylinder, where the circular arc has a radius greater by a second predetermined distance than the outer radius of said coil expander 6, where the circular arc has the both ends thereof located radially coinciding with the radially inward ends 15, 16 of the upper and lower inner surfaces of the ring groove, respectively. The second predetermined distance may be preferably set not smaller than 1/300, and not greater than 1/100, e.g., around 1/200, of the inner diameter of the cylinder 7.

The two axial straight lines of the generating line 17 are defined as two straight lines axially connecting the both ends of the circular arc to the radially inward ends 15, 16 of the upper and lower inner surfaces 13, 14 of the ring groove 11, respectively.

When the blowing-down effect of the blow-by gas can be utilized that flows through the pressure ring above the oil ring, the opening 19 of the oil drain hole 18 may be provided on the bottom surface 12. Although the opening 19 may be most preferably set for the center thereof to coincide with the center of the axial width of the ring groove 11, the center of the opening 19 may be positioned lower than the center of the axial width of the bottom surface 12 or on the lower inner surface 14 of the ring groove 11, similar to the conventional ring grooves. In this embodiment, the cavity space behind the oil ring 10 upward or above the opening 19 of the ring groove 11, is smaller than the conventional ring groove 1 with a square-cornered rectangular cross-section, by a portion shown with cross hatching in FIG. 4.

Figure 3A:
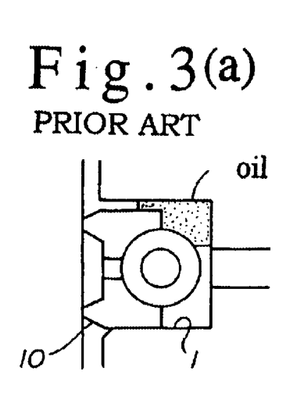
FIGS. 3a–3c is a schematic drawing showing the behavior of oil within a ring groove, showing prior art examples.
Figure 3B:
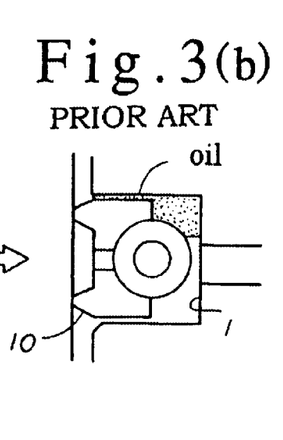
Figure 3C:
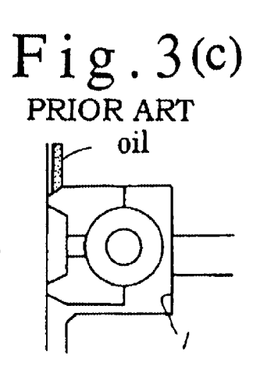
Figure 3D:
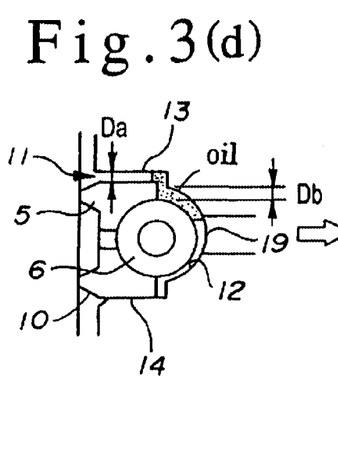
FIGS. 3d–3f is a schematic drawing showing the behavior of oil within a ring groove, showing embodiments of present invention.
Figure 3E:
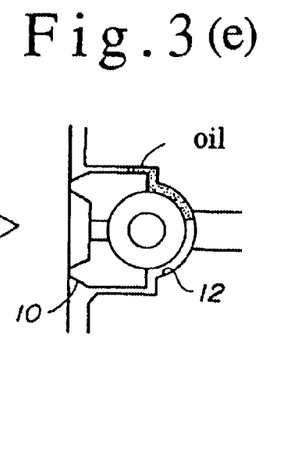
Figure 3F:
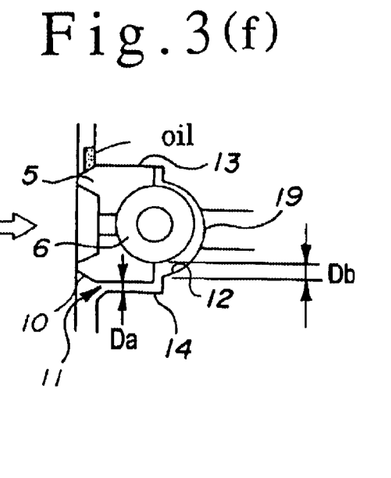

As shown in FIG. 3(d), the ring groove 11 of the first embodiment has a smaller cavity space behind the oil ring 10 than that of the conventional ring groove. Therefore, the oil existing in the cavity space during the exhaust stroke, is smaller in volume than with the conventional ring groove arrangement shown in FIG. 3(a). Consequently, as shown in FIGS. 3(e) and 3(f), in the ring groove of the first embodiment, both the volume of oil pushed out from the ring groove to the outer circumferential surface of the piston due to the oil ring 10 moving toward the upper side of the ring groove, and the volume of oil rising from the oil ring, are also smaller than those of the conventional ring groove arrangement shown in FIGS. 3(b) and 3(c).

While the oil remaining in the cavity space behind the oil ring is blown down toward the oil drain holes by the blow-by gas, the volume of oil remaining in the cavity space behind the oil ring increases during high revolution operation, because the flow volume of the blow-by gas per cycle decreases and the inertia force increases at that time. Nevertheless, in the ring groove arrangement according to the present invention, the oil consumption is considerably reduced in comparison with the conventional ring groove, because the cavity space of the present invention is smaller than that of the conventional ring groove, thereby resulting in a smaller volume of oil remaining in the cavity space behind the oil ring, and, subsequently, a smaller volume of oil rising from the oil ring, than those of the conventional ring groove.

Next, the present invention is further described referring to an illustrative ring groove based on a second embodiment of the present invention, shown in FIG. 5. As shown in FIG. 5, a ring groove 11 of the second embodiment has a flat-bottomed concave surface formed by a generating line 21 drawn on a cross-sectional plane of the ring groove along the centerline of the piston. According to this second embodiment, the generating line 21 comprises an axial straight line and two slant straight lines, where the axial straight line is located radially inwardly apart by a second predetermined distance from the radially inward end of the coil expander 6. The second predetermined distance may be preferably set not smaller than 1/300, and not greater than 1/100, e.g., around 1/200, of the inner diameter of the cylinder 7.

The two slant straight lines of the generating line 21 are defined as two straight lines respectively having one end thereof located coinciding with the radially inward ends 15, 16 of the upper and lower inner surfaces 13, 14 of the ring groove 11, where the two slant straight lines, respectively, are tangent to a circular arc and intersecting the axial straight line. The circular arc has the center thereof located axially coinciding with the center of the axial width of the ring groove 11 and radially coinciding with the center of the coil expander 6 when the oil ring 10 is mounted within the ring groove 11 so that the outer circumferential surface of the ring body 5 is in contact with the inner circumferential surface of the cylinder 7, where the circular arc has a radius greater by a third predetermined distance than the outer radius of the coil expander 6. The third predetermined distance may be preferably set not smaller than 1/300, and not greater than 1/100, e.g., around 1/200, of the inner diameter of the cylinder 7.

Because the generating line 21 of the second embodiment is generally located radially slightly more inward relative to the generating line 17 of the first embodiment, the upper cavity space behind the oil ring 10 in the ring groove 11 is slightly greater than that of the first embodiment. Nevertheless, when compared with that of the conventional ring groove arrangement, the space is decreased by a portion shown with cross hatching in FIG. 6, which means a considerable reduction in space. Thus, the ring groove arrangement of the second embodiment also enables to reduce the oil consumption outstandingly. Portions of the ring groove arrangement and operation of the second embodiment other than the bottom surface configuration, described above, are the same as the first embodiment.

Figure 5A:
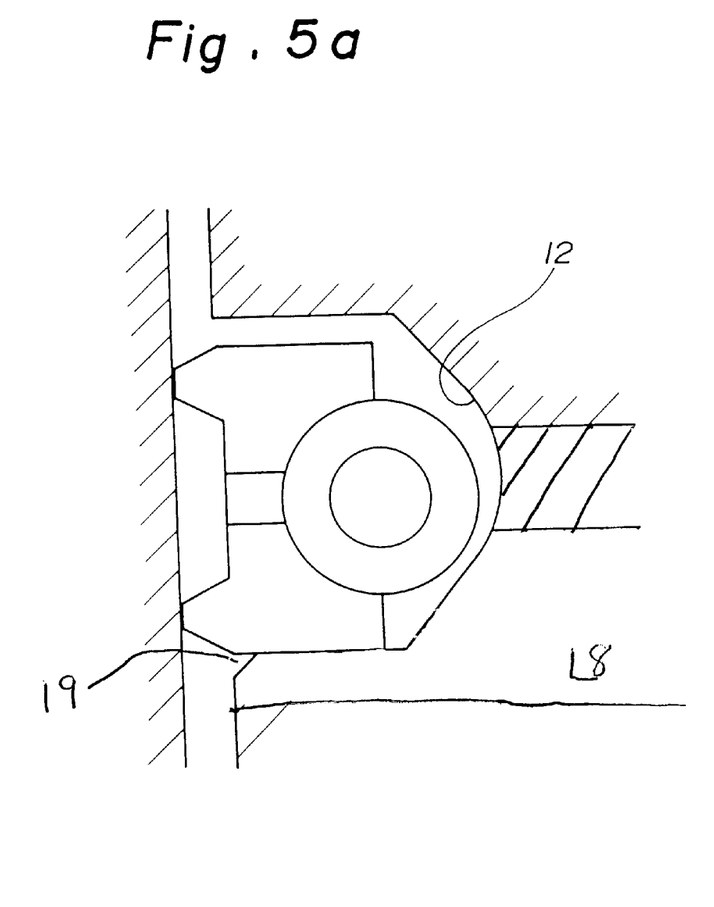

As shown in FIG. 5a, the bottom surface 12 of the ring groove 11 may be arranged to have the generating line located more radially outward than the second embodiment, though, radially more inward than the first embodiment. For example, according to a further aspect of the present invention, the bottom surface 12 may be a round-bottomed concave surface formed by a generating line drawn by combining the same circular arc as of the first embodiment and the same two slant straight lines, tangent to the circular arc, as of the second embodiment.

Figure 6:
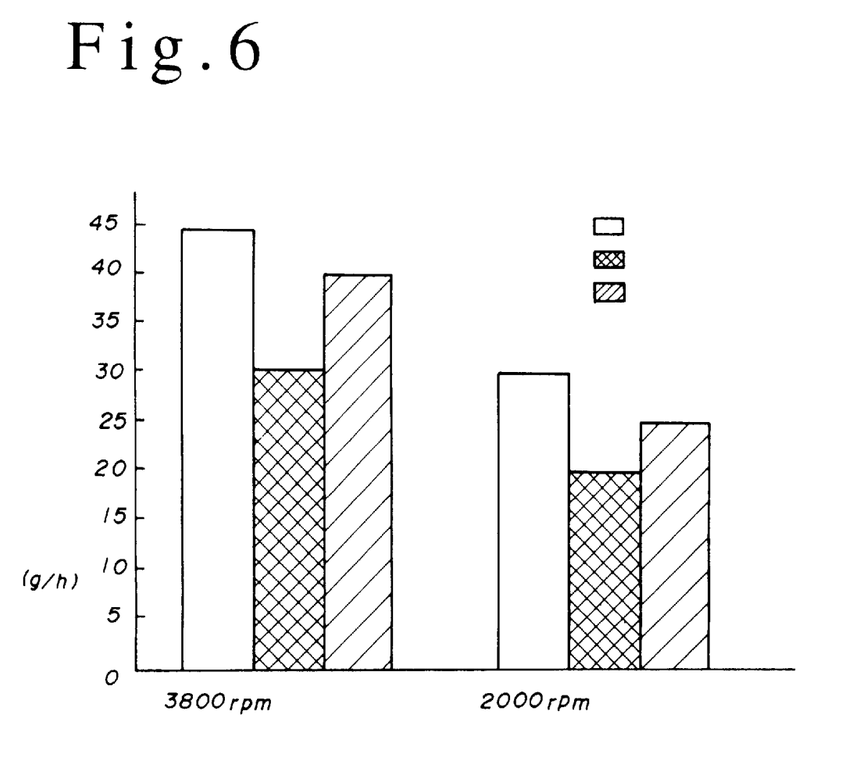
FIG. 6 is a graph showing the results of a measurement test of the oil consumption with a conventional, a first embodiment and a second embodiment samples.

FIG. 6 is a graph showing the results of a measurement test of the oil consumption conducted with a 3.1-liter water-cooled straight-type four-cylinder diesel engine using pistons having a ring groove arrangement according to a conventional example, a first embodiment and a second embodiment, respectively. The graph shows that the oil consumption is reduced by means of the ring groove according to the present invention, where the oil consumption is reduced by approximately 35% with the first embodiment, and by approximately 15% with the second embodiment, from that of the conventional ring groove arrangement.

As described earlier, the opening of the oil drain hole may be located lower than the lower inner surface of the ring groove. While the ring grooves 11 according to a third and a fourth embodiments, respectively shown in FIGS. 7 and 8, employ bottom surfaces 12 similar to the first and second embodiments, respectively, the opening 19 of the oil drain hole 18 may be located as shown in FIGS. 5a, 7 and 8, in a position extending lower than the lower inner surface 14 of the ring groove 11.

Figure 7:
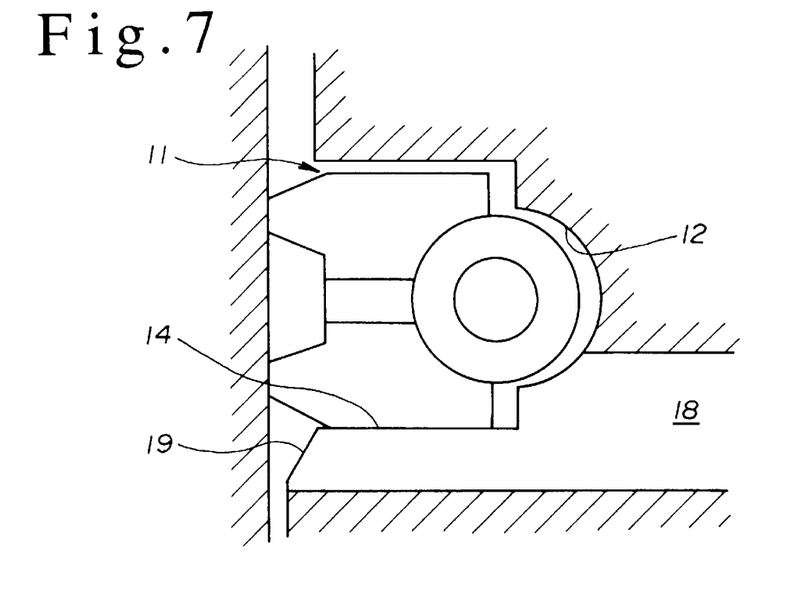
FIG. 7 is an enlarged cross-sectional view of an illustrative ring groove, according to a third embodiment of the present invention.
Figure 8:
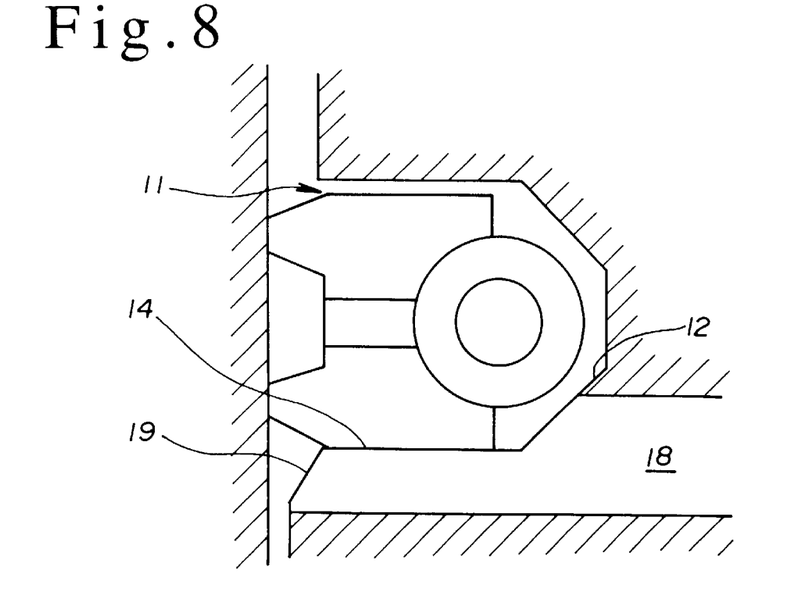
FIG. 8 is an enlarged cross-sectional view of an illustrative ring groove, according to a fourth embodiment of the present invention.

It is noted that, while the third and fourth embodiments shown in FIGS. 7 and 8 use the bottom surfaces of the first and second embodiments, respectively, the usage is for the illustrative purposes only, whereby the application of the third and fourth embodiments are not limited to the first and second embodiments, respectively, but may be made to any embodiments and amendments thereto of the present invention such that, for example, an opening 19 of the fourth embodiment shown in FIG. 8 may be employed with such ring groove 11 of the second embodiment, a's shown in FIG. 4.

Thus, with the arrangement described above, according to the present invention, a ring groove is obtained that has an advantage in that the oil consumption is reduced outstandingly, because the volume of oil remaining in the cavity space behind the oil ring in the bottom surface of the ring groove is considerably decreased due to unique and inventive configuration of the bottom surface of the ring groove reducing the cavity space, and, subsequently, the volume of oil rising from the ring groove is remarkably reduced, in comparison with the conventional ring grooves, also because of an improved disposition of the opening of the oil drain hole in the bottom surface facilitating the effect of blowing down the oil remaining in the cavity space behind the oil ring in the ring groove to reduce the volume of the rising oil.

While there have been shown and described fundamental novel features of the invention as applied to preferred embodiments thereof, it will be understood that various modifications and changes to such embodiments may be made by those skilled in the art without departing from the spirit of the invention. It is our intention, therefore, to be limited only as indicated by the scope of the claims appended hereto.

Reference symbols and numbers used in describing claims attached hereto are intended only for the purpose of having the present invention better understood, and therefore should not be interpreted as limiting the scope of the present invention in any way.

What is claimed is:

1. (Amended) A ring groove of a piston for an oil ring, comprising:

an upper inner surface and a lower inner surface, both said upper and said lower inner surfaces being orthogonal to an axial direction of said piston;

a ring body equipped with a coil expander, said ring body having an upper outer surface and a lower outer surface, both said upper and said lower outer surface being orthogonal to the axial direction of said piston, wherein said upper and lower inner surfaces have radially inward ends located radially inwardly separated by a first predetermined distance from a radially inwards ends of said upper and lower outer surfaces of said ring body when said oil ring is mounted within said ring groove so that an outer circumferential surface of said ring body is in contact with an inner circumferential surface of a cylinder which is engaged with said piston, and said ring groove has a very small cavity space behind said ring body;

a radially inward-most bottom surface connecting said upper and lower inner surfaces, said radially inward-most bottom surface having a concave surface formed by a generating line drawn on a cross-sectional plane of said ring groove along a centerline of said piston, said generating line having an upper and lower ends coinciding with said radially inward ends of said upper and lower inner surfaces of said ring groove, said generating line surrounding said coil expander projecting from said radially inward ends of said ring body so that the generating line is separate from a surface of a projecting portion of said coil expander by a certain predetermined distance, not only when said oil ring stays on a lower side of said ring groove but also when said oil ring moves towards an upper side of said ring groove; and oil drain holes, each of said oil drain holes having an opening located in said radially inward-most bottom surface, wherein said oil ring groove is slightly greater in axial width than said ring body.

2. The ring groove according to claim 1, wherein said first predetermined distance is not smaller than 1/300, and not greater than 1/100, of an inner diameter of said cylinder.

3. The ring groove according to claim 2, wherein said certain predetermined distance is not smaller than 1/300, and not greater than 1/100 of the inner diameter of said cylinder.

4. A ring groove according to claim 1, wherein said generating line further comprises:

a circular arc having a center thereof located axially coinciding with a center of an axial width of said ring groove and radially coinciding with a center of said coil expander when said oil ring is mounted within said ring groove so that said outer circumferential surface of said ring body is in contact with said inner circumferential surface of said cylinder, said circular arc having a radius greater by a second predetermined distance than an outer radius of said coil expander, said circular arc having both ends thereof located radially coinciding with said radially inward ends of said upper and lower inner surfaces of said ring groove, respectively; and two axial straight lines axially connecting said both ends of said circular arc to said radially inward ends of said upper and lower inner surfaces of said ring groove, respectively.

5. The ring groove according to claim 4, wherein said second predetermined distance is not smaller than 1/300, and not greater than 1/100 of the inner diameter of said cylinder.

6. The ring groove according to claim 1, wherein said openings of said oil drain holes are approximately in a center of an axial width of said ring groove.

7. The ring groove according to claim 4, wherein openings of said oil drain holes are approximately in a center of an axial width of said ring groove.

8. The ring groove according to claim 5, wherein said openings of said oil drain holes are approximately in a center of an axial width of said ring groove.

9. The ring groove according to claim 1, wherein said openings of said oil drain holes extends to and crosses said lower inner surface of said ring groove.

10. The ring groove according to claim 4, wherein said openings of said oil drain holes extends to and crosses said lower inner surface of said ring groove.

11. The ring groove according to claim 5, wherein said openings of said oil drain holes extends to and crosses lower inner surface of said ring groove.

12. The ring groove of claim 1, wherein the oil ring groove is 0.04 to 0.06 mm greater in axial width than said ring body.

* * * * *